(12) United States Patent
Bennett et al.

(10) Patent No.: US 8,792,762 B2
(45) Date of Patent: Jul. 29, 2014

(54) LOW LOSS ALUMINUM DOPED OPTICAL FIBER FOR UV APPLICATIONS

(75) Inventors: Kevin Wallace Bennett, Hammondsport, NY (US); Valery A Kozlov, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 291 days.

(21) Appl. No.: 13/118,957

(22) Filed: May 31, 2011

(65) Prior Publication Data
US 2012/0308187 A1 Dec. 6, 2012

(51) Int. Cl.
G02B 6/02 (2006.01)
G02B 6/028 (2006.01)
G02B 6/036 (2006.01)

(52) U.S. Cl.
USPC ............................ 385/124; 385/123; 385/126

(58) Field of Classification Search
USPC .......................................... 385/123, 124, 126
See application file for complete search history.

(56) References Cited

U.S. PATENT DOCUMENTS

| | | | |
|---|---|---|---|
| 3,853,384 A | 12/1974 | Pinnow et al. | |
| 5,904,983 A * | 5/1999 | Chan et al. | 428/392 |
| 6,104,852 A * | 8/2000 | Kashyap | 385/123 |
| 6,590,698 B1 * | 7/2003 | Ohtsuki et al. | 359/326 |
| 7,046,902 B2 | 5/2006 | De Sandro et al. | |
| 7,689,084 B2 | 3/2010 | Chen et al. | |
| 7,813,611 B2 | 10/2010 | Bennett et al. | |
| 2003/0049003 A1 * | 3/2003 | Ahmad et al. | 385/123 |
| 2008/0050076 A1 | 2/2008 | Li et al. | |
| 2009/0181842 A1 * | 7/2009 | Proulx et al. | 501/37 |
| 2009/0245742 A1 * | 10/2009 | Kudou et al. | 385/126 |
| 2011/0205349 A1 * | 8/2011 | Li | 348/65 |

FOREIGN PATENT DOCUMENTS

JP 1993238775 9/1993

* cited by examiner

*Primary Examiner* — Jerry Blevins
(74) *Attorney, Agent, or Firm* — Svetlana Short

(57) ABSTRACT

An optical system comprising: a light source providing light in 300-700 nm range; and an optical fiber optically coupled to the source; the optical fiber is structured to transmit the light provided by the source and comprises Al doped silica based core with 0 to 1 wt % of Ge and no rare-earth metal(s); and at least one silica based cladding surrounding the core. According to some embodiments the fiber includes: a core having a radius of no more than 2.0 μm and having a first index of refraction $n_1$ and a relative refractive index delta with respect to the cladding between 0.15 and 1.0%. The Al doped silica core comprises less than 0.5 wt % of Ge and includes no rare-earth metals; and the silica based cladding surrounding the core has a second index of refraction $n_2$, such that $n_1 > n_2$, the cladding having an outer diameter of 80 μm or greater.

16 Claims, 8 Drawing Sheets

LOW LOSS ALUMINUM DOPED OPTICAL FIBER FOR UV APPLICATIONS

BACKGROUND OF THE INVENTION

1. Field of the Invention

The present invention relates generally to optical fibers, and more specifically to fibers suitable for transmitting UV light.

2. Technical Background

Optical fiber has become a favorite medium for telecommunications due to its high transmission capacity and immunity to electrical noise. Specialized fibers for UV applications have been developed. However, there has not much work done in the area of the composition of silica glass in the fiber other than using either cores consisting of Ge doped silica, or, more typically, fibers with pure silica core fibers with a Fluorine-doped cladding.

Multi-mode (MM) optical Fibers for UV spectral range that comprise pure silica glass core can not supply high (broad enough) bandwidth due to requirement for fiber core graded index profile, graded index is much more difficult to make than with a step index profile with a pure silica core.

While Single Mode (SM) fibers can be made using a step index pure silica core, they typically utilize cladding down-doped to provide the required core delta (relative to cladding). However, when such fibers are heated in order to make optical fiber components such fused biconic taper couplers, for example, fluorine diffuses and migrates into the fiber core, compromising the coupler's performance, or making its loss too high. Optical fiber components can benefit from having a less thermally diffusive index modifying dopant than what is used make pure silica core fibers. Optical fibers with Ge doped cores can utilize pure silica claddings, or silica cladding with less F then what is required by the fibers with pure silica cores. However, MM and SM optical fibers with Ge doped core suffer from relatively high optical loss (e.g., >0.15 dB/m at λ=400 nm and greater than 0.08 dB at λ=425 nm), due to the presence of $GeO_2$ in the core.

SUMMARY OF THE INVENTION

The scope of the present invention is determined by the appended claims.

According to at least one embodiment, an optical system comprises:
a. a light source providing light in 300 nm-700 nm range; and
b. an optical fiber optically coupled to the light source, said optical fiber being structured to transmit the light provided by the light source, said optical fiber comprising:
  i. (i) an Al doped silica based core with 0 to 1 wt % of Ge; and
  ii. (ii) at least one silica based cladding surrounding the cladding.

According to at least one embodiment the optical fiber of the optical system has a fiber core comprises 0 to 0.5 wt % Ge. According to at least one embodiment the fiber core includes no Ge. According to at least one embodiment the optical fiber is a single mode (SM) fiber. According to other embodiments optical fiber is a multi-mode (MM) fiber and has a core diameter of greater than 30 μm (e.g., 40 μm to 250 μm) and attenuation of less than 0.06 dB/m at 400 nm.

According to some exemplary embodiments an optical fiber comprises: a core having a radius $r_1$ of no more than 2 μm (e.g. 1.5 μm or less) and having a first index of refraction $n_1$, the core comprising Al doped silica, Ge concentration of less than 0.5 wt % and, including no rare-earth metals; and at least one silica based cladding surrounding the core and having a second index of refraction $n_2$, such that $n_1 > n_2$. Preferably, according to some embodiments, the cladding has an outer diameter of equal to or greater than 60 μm, and preferably at least 80 μm, for example 90 μm, 100 μm, 110 μm, or 120 μm to 130 μm, or greater.

According to some embodiments the fiber is a single mode fiber and has a single mode cutoff wavelength λc of no more than 450 nm, for example between 350 nm and 450 nm, or between 380 nm and 420 nm. In some embodiments, the optical fiber is a single mode fiber that has a single mode cutoff wavelength λc, where λc is 415 nm or less, 410 nm or less, 405 nm or less, 400 nm or less, or 390 nm or less. In some embodiments the relative refractive index of the core with respect to the cladding is between 0.25 and 1%, for example 0.3% and to 0.4%, or between 0.33% and 0.38%. According to some embodiments the fiber core includes 2 to 12 wt % $Al_2O_3$.

Some of the advantages the optical fibers disclosed herein are their ability transmit light in the UV range with very low optical attenuation while having control of the profile due to using a dopant such as $Al_2O_3$.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION OF THE PREFERRED EMBODIMENTS

Figure 1:
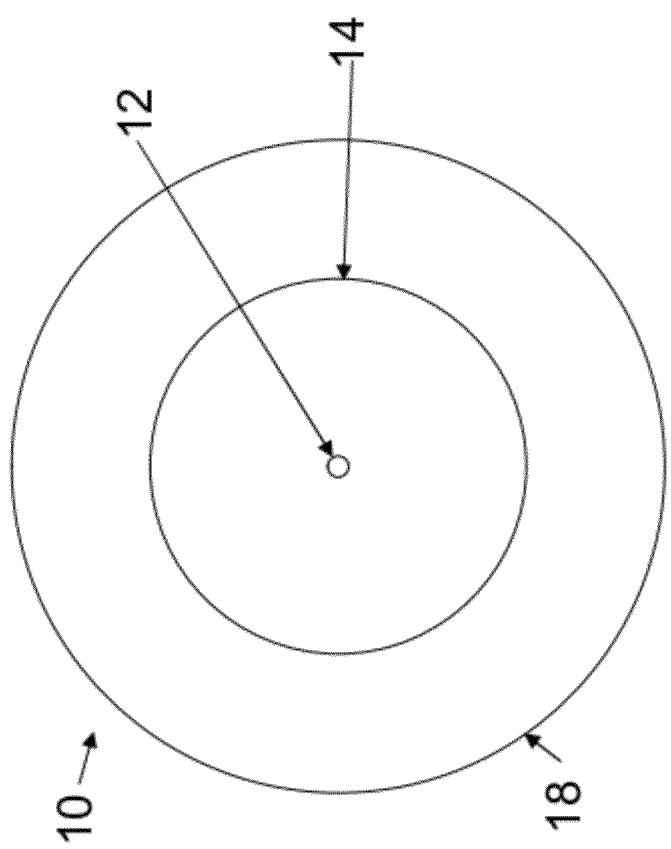
FIG. 1 is a schematic cross-sectional view of one embodiment of the present invention.

Reference will now be made in detail to the present preferred embodiments of the invention, examples of which are illustrated in the accompanying drawings. Whenever possible, the same reference numerals will be used throughout the drawings to refer to the same or like parts. One embodiment of optical fiber in accordance with the present invention is shown schematically in FIG. 1, and is designated generally throughout by the reference numeral 10. The optical fiber 10 illustrated in FIG. 1 includes: a silica based, Al doped core 12 having a first index of refraction $n_1$; at least one silica based cladding 14 surrounding the core and having a second index of refraction $n_2$, such that $n_1 > n_2$; and at least one coating 18. Coating 18 may comprise one or more layers, for example a primary coating layer 18A, and a secondary coating layer 18B.

In these embodiments the silica based core 12 comprises of Al doped silica with less than 1 wt % Ge. Preferably the core 12 has no Ge. The core has 12 no active or rare earth dopants such as Er or Yb. The core 12 may be either circular, or elliptical (not shown). It is preferable that the cladding 14 has a relative refractive index delta (relative to that of the cladding) of about $0.25\% \leq \Delta$ to $\leq 1\%$, e.g., $0.3\% \leq \Delta \leq 0.4\%$, or $33\% \leq \Delta \leq 0.38\%$. The numerical aperture NA of core is defined as $(n_1^2 - n_2^2)^{1/2}$. The core preferably has numerical aperture NA between 0.09 and 0.30 and more preferably between 0.11 and 0.21.

The core 12 may be either a single mode core, or a multi mode core. It is preferable that the Al doped core 12 contains about 2 to about 12 wt % $Al_2O_3$. The core 12 has 0 to 1 wt % of Ge, preferably less than 0.5 wt % Ge, more preferably no more than 0.25 wt % Ge, and most preferably no Ge (0 wt % Ge). The low amount of Ge (or no Ge) in the core minimizes optical attenuation (loss) within the core 12. In some exemplary embodiments the cladding 14 is pure silica. In some exemplary embodiments the cladding 14 is F doped silica, such that F content of the cladding is between 0 and 5 wt %. In some exemplary embodiments the cladding is at least 90 μm in diameter, for example 90 μm, 100 μm, 110 μm, or 120 μm to 130 μm, or greater.

Preferably, if the fiber is a single mode fiber, the single mode (LP00) cutoff wavelength λc is not more than 450 nm (and preferably 420 nm or less) and the relative refractive index of the core with respect to the cladding is between 0.25% and 1.0%, for example between 0.33 and 0.38%. According to some embodiments the optical fiber is a single mode fiber and has a single mode cutoff wavelength λc between 350 nm and 450 nm, for example between 380 nm and 420 nm. In some embodiments, the optical fiber is a single mode fiber that has a single mode cutoff wavelength λc, where λc is 415 nm or less, 410 nm or less, 405 nm or less, 400 nm or less, or 390 nm or less.

Figure 2:
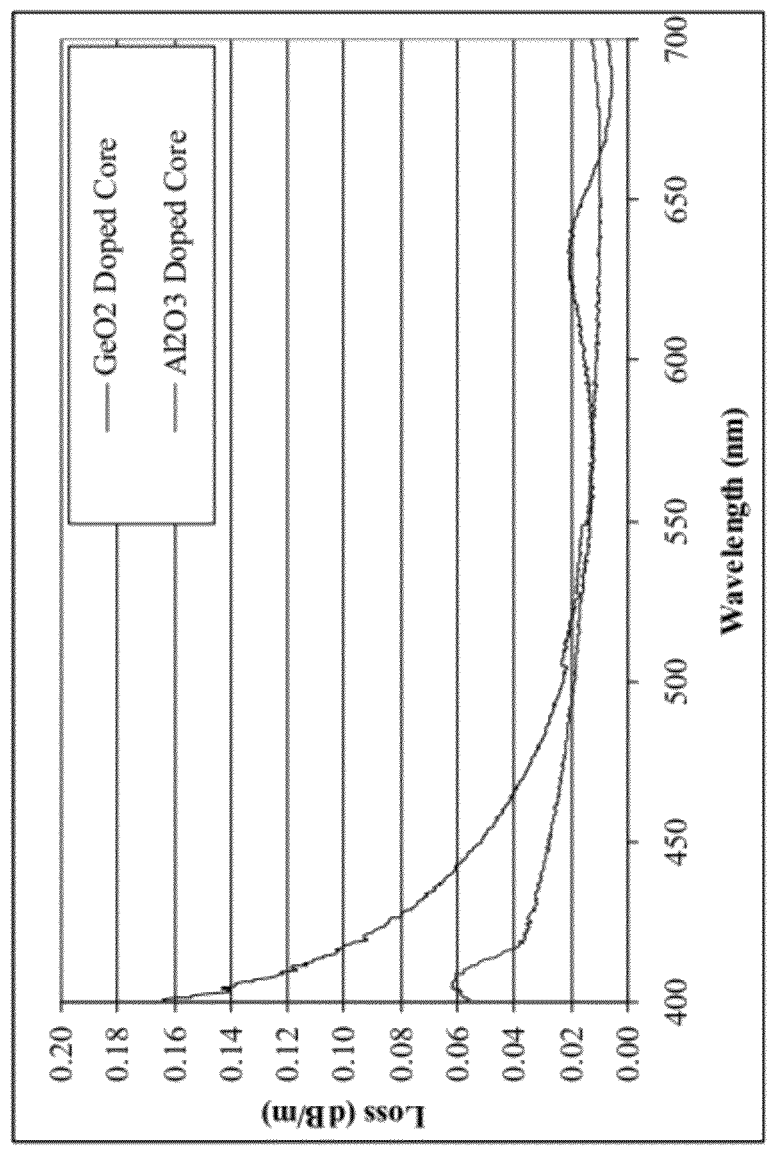
FIG. 2 is a graph of spectral attenuation (loss) of a manufactured $GeO_2$-doped single-mode (solid line) and a (manufactured) fiber according to one exemplary embodiment of the present invention.

FIG. 2 shows measured spectral attenuation (also referred to as an optical loss herein) for manufactured comparative example Ge-doped SM fiber (top curve), and measured spectral attenuation for the Al-doped SM (single mode) fiber 10 according to one embodiment of the present invention (bottom curve), at the 400 nm to 700 nm wavelength range. It should be noted that both fibers were coated only by an acrylate coating. For example, FIG. 2 demonstrates that the Al doped fiber that has no Ge or very little Ge (less than 1 wt %, or less than 0.5 wt %) has a much smaller loss than the typical Ge doped fiber. It should be noted that the attenuation "bump" around 400 nm in the Al doped fiber 10 corresponding to FIG. 2 is due to its cutoff wavelength λc being 419 nm. A smaller loss at the 400 nm to 425 nm spectral range can be obtained by moving the fundamental cutoff wavelength λc to shorter wavelengths, for example to less than 415 or less than 410 nm, preferably to less than 405 nm, and even more preferably to 400 nm or less. This can be accomplished by either reducing the core diameter or lowering the refractive index delta.

According to some embodiments, the single mode optical fiber 10 has an optical loss (measured by cutback technique) of less than 0.1 dB/m at 400 nm wavelength and less than 0.080 dB/m at 425 nm. For example, the optical fiber 10 corresponding to FIG. 2 has a single mode cutoff wavelength λc of less than 420 nm and an optical loss of less than 0.08 dB/m at 400 nm and 425 nm wavelengths. More specifically, the fiber 10 corresponding to FIG. 2 has optical loss of less than 0.07 dB/m at 400 nm wavelength and less than 0.05 and even less than 0.04 dB at a 425 nm wavelength.

EXAMPLES

The invention will be further clarified by the following examples.

Examples 1 and 2

SM Fibers

Figure 3:
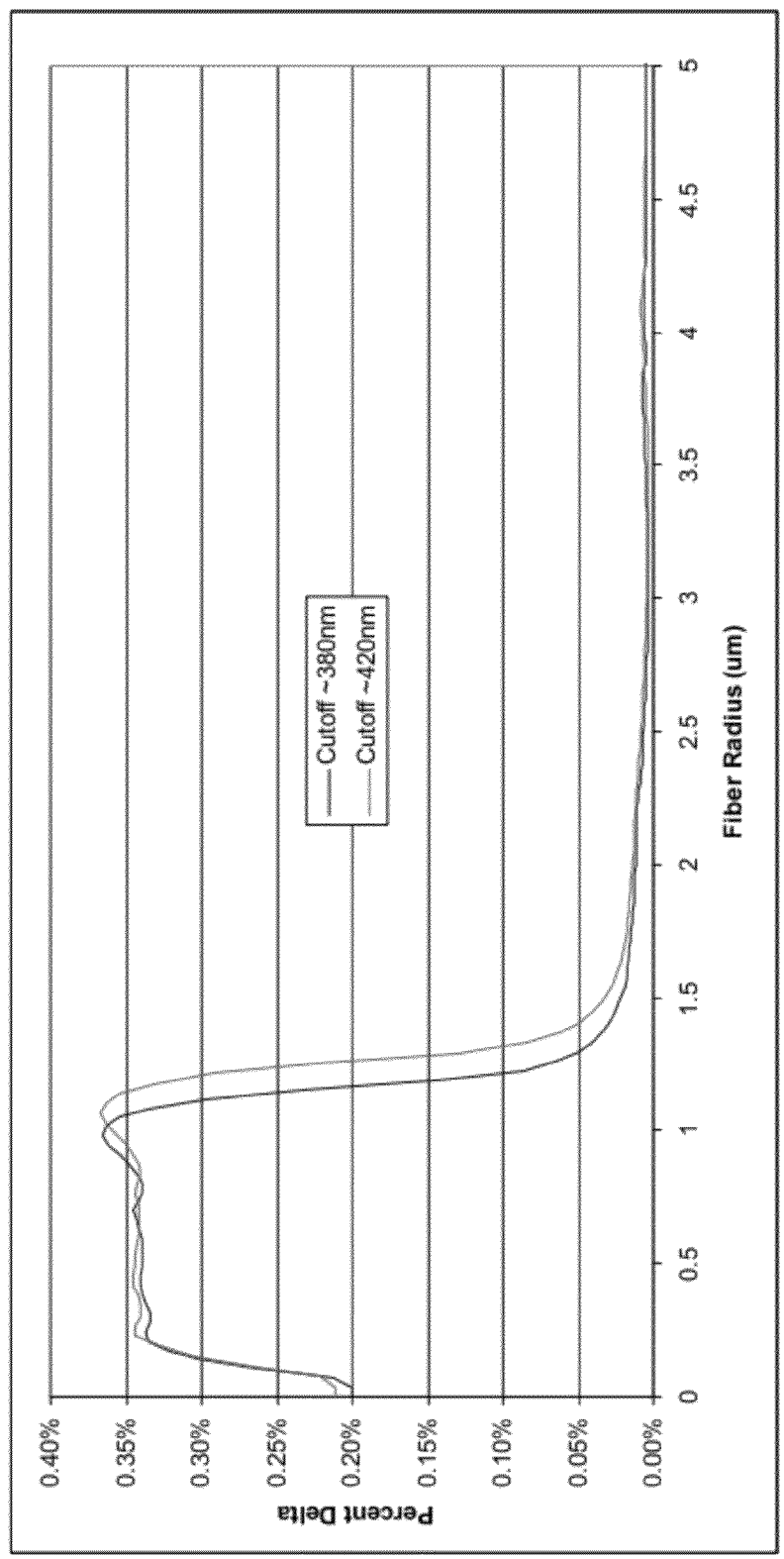
FIG. 3 is a refractive index profile of a two exemplary embodiments of a single mode optical fiber in accordance with the present invention.

FIG. 3 illustrates refractive index profile (core and cladding) of the first and second exemplary SM optical fibers 10 that have Al doped core with no Ge. These optical fibers have the cross-section illustrated in FIG. 1. More specifically, FIG. 3 depicts optical fibers' refractive index percent delta (relative to that of the cladding) vs. the distance (radius) measured from the core center. The refractive index percent delta is defined herein as $(n_1^2 - n_2^2)/2n_2^2$. The cutoff wavelength λc for the first exemplary optical fiber 10 is 420 nm, and for the second exemplary optical fiber 10 (the fiber with slightly larger core radius) is 380 nm.

These optical fibers have an Al doped core 12, and a silica cladding 14. The Al doped core of this example has a very well defined step index (see FIG. 3), because of no or very little diffusion of Al into the cladding. That is, the low mobility of the Al ions in silica glass makes it a superior dopant for index profile control as compared to Ge-doped fiber. FIG. 3 shows that for these two optical fibers 10 the relative refractive index difference (percent delta) of the core 12 is about 0.35, and core NA is about 0.12. In these exemplary fibers the Al-doped (about 4 wt % of $Al_2O_3$) fiber core 12 is single-mode for the wavelengths above 400 nm. The single mode core is preferably 2.4 to 3.0 μm in diameter, and in this example is about 2.6 μm. If the core NA is lower (0.10, for example), the core diameter would have to be larger (about 3.5 microns, for example) in order to be single mode. The bigger core diameter and lower core NA allows the core 12 to stay single-mode.

The fibers of FIG. 3 can be produced by the outside-vapor-deposition process (OVD). The OVD process is a way of making optical fiber by depositing from the desired vapor ingredients (including silica and the desired dopants) reacting with oxygen in a flame to form the soot-particles on a bait rod, for making fiber soot-preform. The soot-preform is then consolidated into solid transparent glass in a high temperature furnace, after the bait rod is removed. The core/cladding compositions are achieved by utilizing different vapor-ingredients for each of the layers in the soot preform forming process. The core/cladding soot performs is generated first, is then consolidated into the final preform. The final preform is then drawn into optical fiber 10 by known fiber-drawing methods.

The specific composition for the optical fibers 10 corresponding to FIG. 2 is:

Core 12: $SiO_2$ with 4 wt % $Al_2O_3$; Cladding 14: Pure Silica; Coating 18: acrylate coating.

Figure 4:
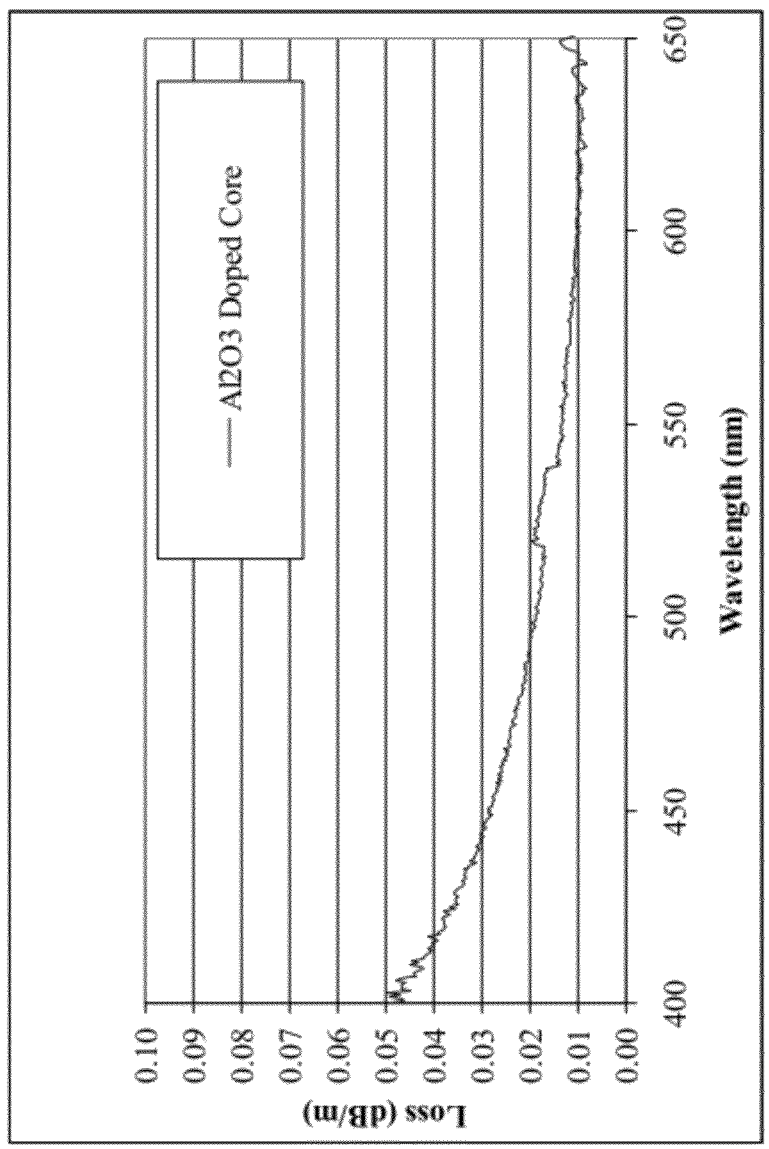
FIG. 4 is a graph of spectral attenuation (loss) of a single mode fiber according to one embodiment of the present invention that corresponds to one of the fiber profiles depicted in FIG. 3.

FIG. 4 illustrates the attenuation of optical fiber 10 of the second exemplary optical fiber 10 (the fiber with slightly larger core radius) and 380 nm cutoff wavelength. FIG. 4 demonstrates that the Al doped fiber that has no Ge, and whose cutoff wavelength is <400 nm, has better attenuation at 400 to 425 nm than the optical fiber 10 of FIG. 2. For example, of the optical loss (spectral attenuation) of this optical fiber 10 is less than 0.06 dB/m at 400 nm, and more specifically less than 0.055 dB/m (e.g., equal to or less than 0.05 dB) at 400 nm. The optical loss (spectral attenuation) of this optical fiber 10 is equal to or less than 0.04 dB/m at 425 nm, and more specifically is equal to or less than 0.035 dB/m at 425 nm (see FIG. 4).

Examples 3-10

SM Fibers

The following table provides the parameters for the modeled single mode optical fibers 10 of optical examples 3-10. These fibers comprise an Al-doped silica core with less than 0.5 wt % of Ge, and pure silica cladding with claddings having outer diameter of 80 μm or greater.

TABLE 1

| Example 3 | Core Diameter (μm) | Percent Delta (%) Relative to cladding | Cutoff Wavelength (nm) |
|---|---|---|---|
| Example 4 | 1 | 0.85% | 420 |
| Example 5 | 1.5 | 0.65% | 420 |
| Example 6 | 2 | 0.49% | 420 |
| Example 7 | 2.5 | 0.35% | 420 |
| Example 8 | 3 | 0.25% | 420 |
| Example 9 | 3.5 | 0.19% | 420 |
| Example 10 | 4 | 0.15% | 420 |

More specifically, the fibers 10 of examples 3-10 are designed to have a single mode cutoff wavelength 420 nm and have modeled optical loss of less than 0.07 dB/m at 400 nm wavelength and less than 0.05 and even less than 0.04 dB/m at a 425 nm wavelength.

Examples 11 and 12

Multi Mode Fiber

Figure 5:
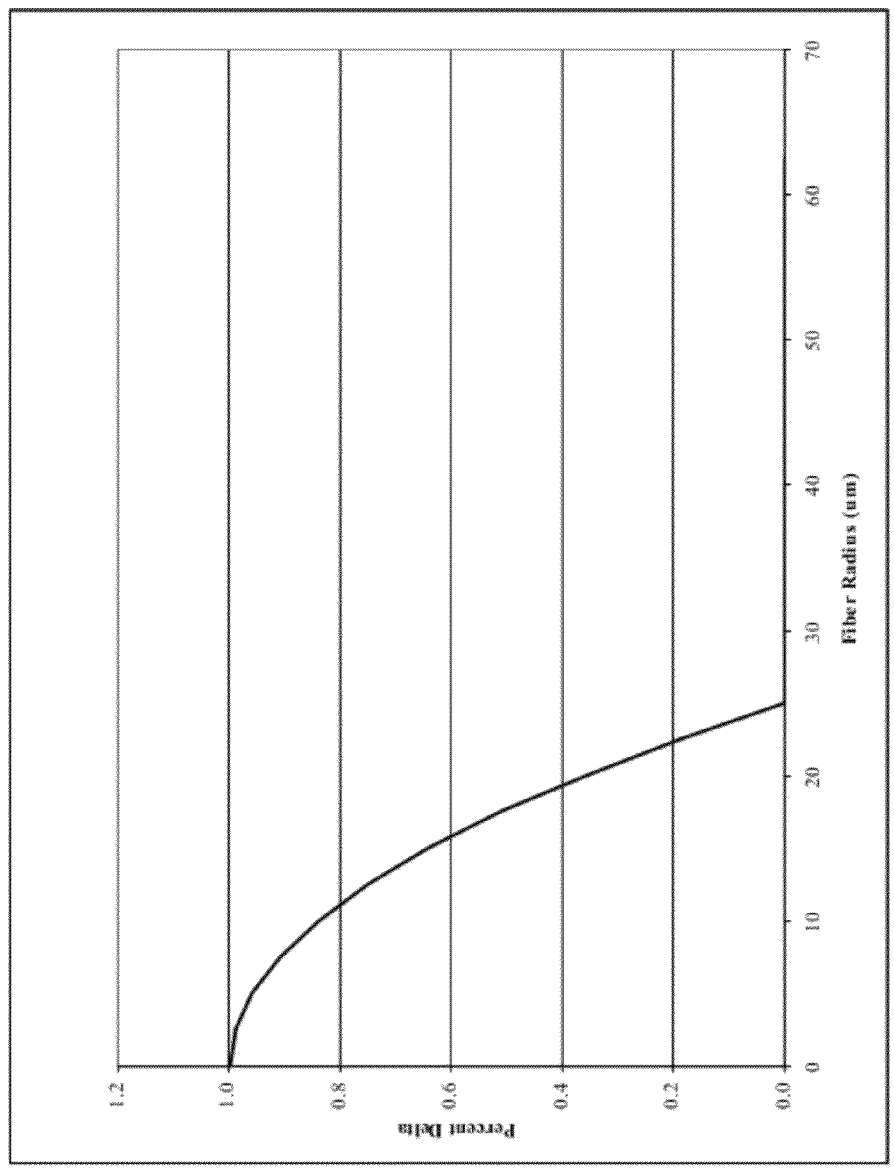
FIG. 5 is a refractive index profile of one exemplary embodiment of a multimode mode optical fiber in accordance with the present invention.
Figure 6:
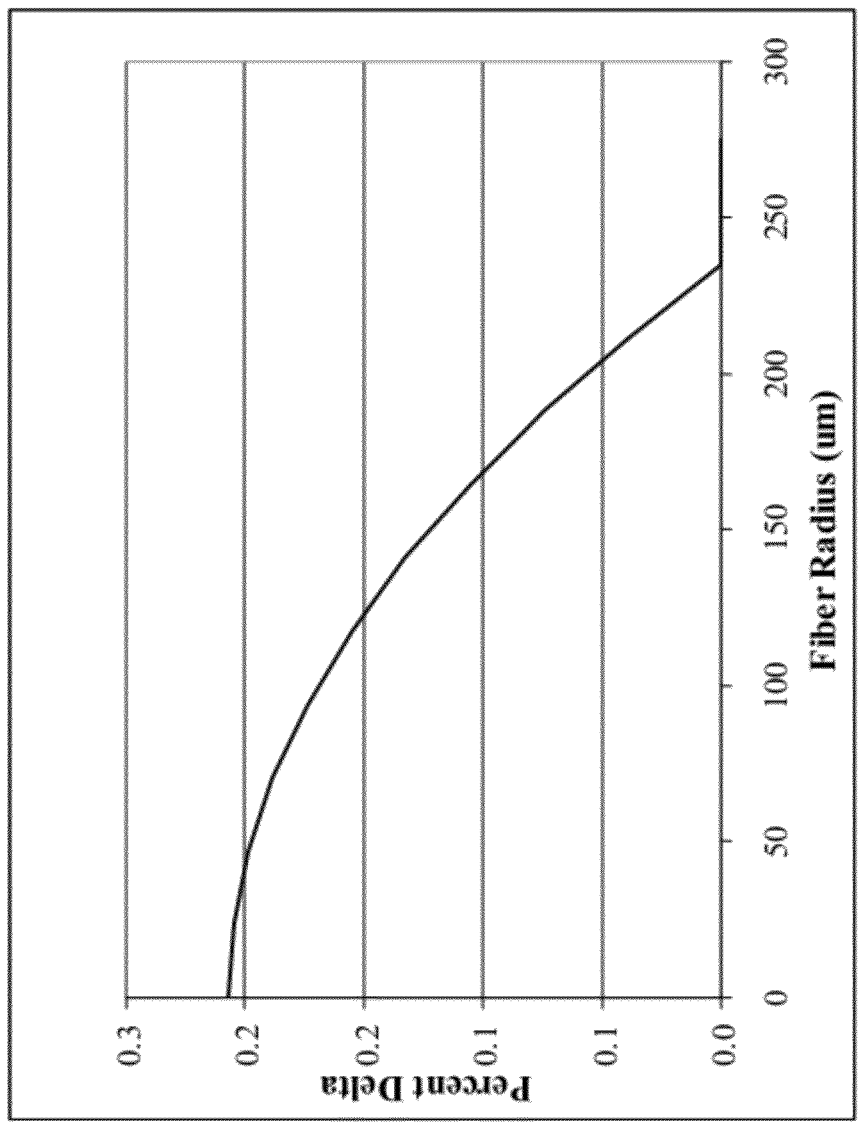
FIG. 6 is a refractive index profile of another exemplary embodiment of a multimode mode optical fiber.

FIGS. 5 and 6 illustrates a refractive index profile (core and cladding) of other exemplary optical fibers (MM fibers) of the present invention. These optical fibers have the fiber the cross-section schematically illustrated in FIG. 1 and have core diameters of greater than 30 μm (e.g., 40 to 250 μm or greater). More specifically, FIGS. 5 and 6 depict optical fiber's refractive index percent delta (relative to that of the cladding) vs. the distance measured from the core center. These modeled optical fibers have an Al doped multi mode core 12, and a silica cladding 14. The Al doped multi mode core of these two examples have a graded index. The MM optical fiber of example 11 (see FIG. 5) has a core diameter of about 50 μm, while the MM optical fiber of example 12 (see FIG. 6) has a core diameter of about 469 μm. The MM optical fiber of example 11 had a core diameter NA of about 0.2, while the MM fiber optical fiber of example 12 has a core NA of 0.093.

It is noted that the precise amount of Al dopant at different core locations is easier to control than the amount of Ge in Ge doped fibers. That is, the low mobility of the Al ions in silica glass makes it a superior dopant for index profile control as compared to Ge-doped fiber. It is noted that the addition of Al dopant allows for graded index multi-mode profiles where pure silica core fiber can only be made as a step-index fiber. The graded index profile may be critical to high bandwidth in multi-mode fibers and enables long length, high resolution measurements.

The relative refractive index difference (percent delta) of the core 12 of the optical fiber of example 11 is about 1.0. In this example, the Al-doped (12 wt % of $Al_2O_3$) fiber core 12 is multi-moded. The multi mode core is preferably 35 μm to 65 μm in diameter, preferably about 50 to 60 μm, and the cladding outer diameter in this exemplary embodiment is 125 μm. The specific composition for the optical fiber of the fiber example is:

Core 12: $SiO_2$ with 12 wt % $Al_2O_3$; Cladding 14: pure silica

The relative refractive index difference (percent delta) of the core 12 of the optical fiber of example 12 is about 0.2%. In this example, the Al-doped (2.5 wt % of $Al_2O_3$) fiber core 12 is multi-moded. The multi mode core of the example 12 according to example is 400 μm to 500 μm in diameter, for example about 450 to 475 μm, and the cladding outer diameter in this exemplary embodiment is about 550 μm.

The fibers of FIGS. 5 and 6 can also be produced by the outside-vapor-deposition process (OVD). The OVD process is a way of making optical fiber by depositing from the desired vapor ingredients (including silica and the desired dopants) reacting with oxygen in a flame to form the soot-particles on a bait rod, for making fiber soot-preform. The soot-preform is then consolidated into solid transparent glass in a high temperature furnace, after the bait rod is removed. The core/cladding compositions are achieved by utilizing different vapor-ingredients for each of the layers in the soot preform forming process. The core/cladding soot performs is generated first, is then consolidated into the final preform. The final preform is then drawn into optical fiber 10 by known fiber-drawing methods.

Figure 7:
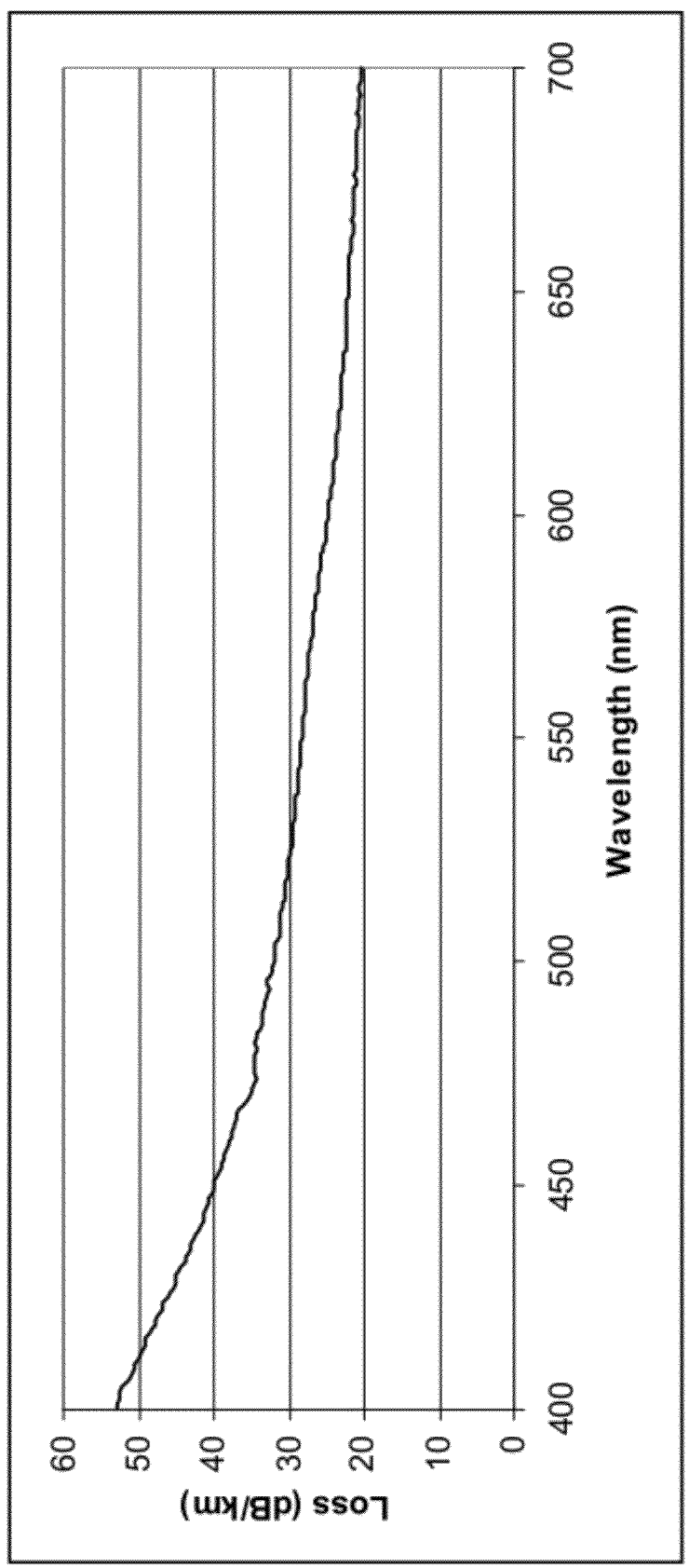
FIG. 7 is a graph of spectral attenuation (loss) of a single mode fiber according to one embodiment of the present invention that corresponds to one of the fiber profiles depicted in FIG. 5; and
}

The core diameter of the MM Al doped optical fiber 10 is preferably greater than 50 μm. FIG. 7 shows measured spectral attenuation (also referred to as an optical loss herein) for manufactured Al-doped MM (multi mode) fiber 10 according to the embodiment shown in FIG. 5, at the 400 nm to 700 nm wavelength range. This fiber has spectral attenuation (loss) of less than 0.06 dB/m at 400 nm, and more specifically has spectral attenuation (loss) of less than 0.05 dB/m at 400 nm. This MM fiber of FIG. 5 has spectral attenuation of less than 0.05 dB/m at 425 nm, and less than 0.042 dB/m (e.g., about 0.04 dB/m) at 450 nm. The spectral attenuation in the 450 nm to 700 nm wavelength range is even lower. The spectral attenuation (loss) of the optical fiber of FIG. 6 is similar to that of the optical fiber of FIG. 5.

The multimode Al doped core fiber according to the embodiments of the present invention are uniquely suitable for use in UV-VIS systems because they have lower attenuation than the Ge doped fibers in the wavelength range of interest (i.e., 350 nm to 700 nm) and can be readily made with graded index profiles to improve bandwidth, unlike pure silica core fibers.

Optical System

Figure 8:
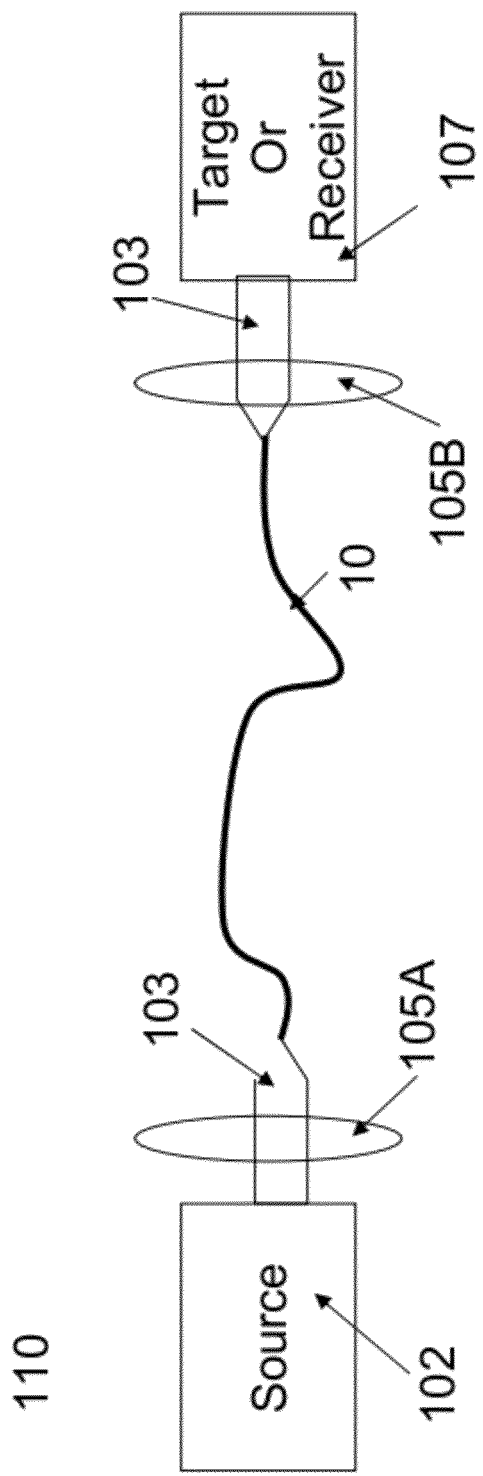
FIG. 8 is a schematic cross-sectional view of an optical system incorporating a UV transmitting fiber of FIG. 1, 4, 5 or 6.

The UV light transmitting optical fiber 10 can be utilized in any optical system that requires transmission of UV light. A typical optical system 110 comprises a light source 102 for providing visible or UV light 103 (e.g., within 300 to 700 nm range or 300-4500 nm) range and an optical fiber 10 optically coupled to the light source 102. The optical fiber 10 is structured to transmit the light (e.g., UV light) provided by the light source and comprises Al doped silica based core with 0 to 1 wt % of Ge; and at least one silica based cladding surrounding the cladding. The optical fiber 10 may be, for example, a multi-mode fiber and has a core diameter of greater than 30 μm and attenuation of less than 0.06 dB/m at 400 nm, or a single mode optical fiber with the core radius not greater than 2.0 μm. The optical fiber 10 may be coupled to the light source 102 through a lens component 105A (see FIG. 8, for example), or through another optical component (not shown). Such an optical system may be utilized, for example, in lithography, to provide UV light on a receiving surface 107, by coupling UV light at the output fiber 10 via another lens component 105B, or another element(s).

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical fiber comprising:
   (i) a core having a radius $r_1$ of no more than 2.0 μm and having a first index of refraction $n_1$ and a relative refractive index $\Delta$ of the core with respect to the cladding between 0.15% and 1.0%, said core comprising Al doped silica with 2-12 wt % Al, Ge concentration of less than 0.5 wt % and no rare-earth metals; and
   (ii) at least one silica based cladding surrounding the core and having a second index of refraction $n_2$, such that $n_1 > n_2$, said cladding having an outer diameter of 80 μm or greater.

2. The optical fiber of claim 1, wherein said fiber has a single mode cutoff wavelength of less than 450 nm and the relative refractive index of the core with respect to the cladding is between 0.2 and 1.0%.

3. The optical fiber of claim 1, wherein said fiber has a single mode cutoff wavelength of no more than 400 nm.

4. The optical fiber of claim 1, wherein said fiber has an optical loss of less than 0.1 dB/m at 400 nm wavelength and less than 0.08 dB/m at 425 nm.

5. The optical fiber of claim 1, wherein said fiber has a single mode cutoff wavelength of less than 420 nm and an optical loss of less than 0.08 dB/m at 400 nm and 425 nm wavelengths.

6. The optical fiber of claim 1, wherein said fiber has a single mode cutoff wavelength of less than 400 nm and an optical loss of less than 0.07 dB/m at 400 nm wavelength and less than 0.04 dB at 425 nm wavelength.

7. The optical fiber of claim 2, wherein said fiber has a single mode cutoff wavelength of less than 420 nm and an optical loss of less than 0.07 dB/m at 400 nm wavelength and less than 0.05 dB/m at 425 nm wavelength.

8. The optical fiber according to claim 1 wherein the core has a relative refractive index delta with respect to the cladding between 0.25% and 1.0% and either be pure silica or F-doped silica cladding.

9. The optical fiber according to claim 1 wherein the core has a relative refractive index delta with respect to the cladding between 0.33 and 0.37%.

10. An optical system comprising:
    (A) the optical fiber of claim 1; and
    (B) a light source providing light in 300-700 nm range coupled to said fiber.

11. An optical fiber comprising:
    (i) a core consisting essentially of Al doped silica having a first index of refraction $n_1$;
    (ii) at least one silica based cladding surrounding the core and having a second index of refraction $n_2$, such that $n_1 > n_2$, said cladding having an outer diameter of greater than 60 μm thick
    wherein said cladding comprises of Si and 0-5 wt % F; wherein said core is a single mode core with a relative index delta with respect to said cladding between 0.2% and 1.0%, and a core diameter of 0.5 μm to 4 μm, said core comprising 2-12 wt % Al.

12. The optical system of claim 11, wherein said optical fiber is a single mode fiber and has with attenuation of less than 0.05 dB/m at 400 nm.

13. The optical system of claim 11 wherein said optical fiber is a single mode fiber and has with attenuation of less than 0.04 dB/m at 425 nm.

14. An optical system comprising:
    (A) an optical fiber comprising: a core consisting essentially of Al doped silica having a first index of refraction $n_1$; and at least one silica based cladding surrounding the core and having a second index of refraction $n_2$, such that $n_1 > n_2$, said cladding having an outer diameter of greater than 60 μm thick; and
    (B) a light source providing light in 300-700 nm range coupled to said fiber, wherein said cladding comprises of Si and 0-5 wt % F; wherein said core is a single mode core with a relative index delta with respect to said cladding between 0.2% and 1.0%, and a core diameter of 0.5 μm to 4 μm, said core comprising 2-12 wt % Al.

15. An optical system comprising:
    (A) an optical fiber comprising: a core consisting essentially of Al doped silica having a first index of refraction $n_1$; and at least one silica based cladding surrounding the core and having a second index of refraction $n_2$, such that $n_1 > n_2$, said cladding having an outer diameter of greater than 60 μm thick; and
    (B) a light source providing light in 300-700 nm range coupled to said fiber, wherein said optical fiber is a multi-mode fiber and has a core diameter of greater than 30 μm and attenuation of less than 0.06 dB/m at 400 nm.

16. The optical system of claim 15 wherein said optical fiber has attenuation of less than 0.05 dB/m at 400 nm.

* * * * *